United States Patent [19]

Wiedersatz

[11] Patent Number: 5,858,431
[45] Date of Patent: Jan. 12, 1999

[54] METHOD AND APPARATUS FOR PREPARING FAT FREE SNACK CHIPS USING HOT AIR IMPINGEMENT, MICROWAVING, AND HOT AIR DRYING

[75] Inventor: John Wiedersatz, Jeffersonville, Ind.

[73] Assignee: International Machinery, Inc., Santa Barbara, Calif.

[21] Appl. No.: 756,275

[22] Filed: Nov. 25, 1996

[51] Int. Cl.⁶ ..................................................... A21D 6/00
[52] U.S. Cl. .......................... 426/242; 426/289; 426/302; 426/637; 99/447
[58] Field of Search .................................... 426/102, 242, 426/243, 296, 464, 510, 523, 524, 560, 637, 808, 289, 302; 99/447, 451; 126/21 A; 219/400

[56] References Cited

U.S. PATENT DOCUMENTS

| | | |
|---|---|---|
| 3,365,301 | 1/1968 | Lipoma et al. . |
| 3,413,433 | 11/1968 | Timmermans et al. . |
| 3,469,996 | 9/1969 | Endres et al. . |
| 3,474,544 | 10/1969 | Holden, Jr. et al. . |
| 3,502,479 | 3/1970 | Singer et al. . |
| 3,710,064 | 1/1973 | Mathur . |
| 3,765,425 | 10/1973 | Stungis et al. . |
| 3,989,849 | 11/1976 | Fogel et al. . |
| 4,149,322 | 4/1979 | Minoda et al. . |
| 4,283,425 | 8/1981 | Yuan et al. . |
| 4,756,916 | 7/1988 | Dreher et al. ........................... 426/302 |
| 4,800,090 | 1/1989 | August . |
| 4,873,093 | 10/1989 | Fazzolare et al. ........................ 426/28 |
| 4,906,483 | 3/1990 | Kloos . |
| 4,925,013 | 5/1990 | Lapeyre . |
| 4,933,194 | 6/1990 | Barry et al. . |
| 4,933,199 | 6/1990 | Neel et al. . |
| 5,180,601 | 1/1993 | Gaon et al. . |
| 5,202,139 | 4/1993 | Gaon et al. . |
| 5,298,707 | 3/1994 | Sprecher et al. . |
| 5,370,898 | 12/1994 | Zussman ................................. 426/615 |
| 5,392,698 | 2/1995 | Sprecher et al. . |
| 5,393,543 | 2/1995 | Laufer .................................... 426/241 |
| 5,470,600 | 11/1995 | Petelle et al. .......................... 426/237 |

FOREIGN PATENT DOCUMENTS

| | | |
|---|---|---|
| 1151 945 | 8/1983 | Canada . |
| 32 33 819 A1 | 9/1982 | Germany . |
| 63-304941 | 12/1988 | Japan . |

*Primary Examiner*—Jeffrey Stucker

[57] ABSTRACT

A method and apparatus for preparing essentially fat free chips such as potato chips and the like having an appearance and taste similar to conventional chips without the use of deep fat frying is disclosed herein. The method and apparatus include exposing sliced raw potatoes and the like to a hot air fluid bed impingement oven arrangement that causes very rapid heating of the water contained in the chip and causes the chip to expand. The hot air fluid bed impingement oven arrangement preferably includes multiple dual-zone hot air fluid bed impingement ovens operating under different predetermined conditions. The slices are passed through each oven based on a desired conveyor belt speed and temperature range. The slices are then passed to a combination microwave and hot air dryer which removes entrained moisture without scorching the chips, thereby providing a lightly colored chip without a burned, overcooked taste and with an equalized moisture content. The resulting chip has an excellent mouth feel without the added fat associated with deep fat fried chip foods. Slices may be seasoned between exposure to the impingement oven arrangement and the microwave drying process.

41 Claims, 4 Drawing Sheets

METHOD AND APPARATUS FOR PREPARING FAT FREE SNACK CHIPS USING HOT AIR IMPINGEMENT, MICROWAVING, AND HOT AIR DRYING

BACKGROUND OF THE INVENTION

1. Field of the Invention

The present invention relates generally to the art of making food chip products, and more specifically to a method and apparatus for making fat-free potato chips using a combination of hot air impingement and microwave/hot air drying.

2. Description of the Related Art

Food chip products such as potato chips and tortilla chips are typically produced using hot oil. The manufacturer fries the potato slices or tortilla slices in hot oil, which reduces the moisture content of the slices. Subjecting these food products to hot oil results in a final chip having a fat content of greater than 35 per cent by weight.

Today's health conscious consumer is looking for a low fat alternative to the traditional fried chip, and preferably a completely fat free product having minimal taste differences from the fried product. Different methods and means of preparing a fat-free chip have been employed in the past, including subjecting the chip to various processes which involve, at some stage of preparation, the application of a reduced amount of oil (see, e.g., Dreher et al., U.S. Pat. No. 4,756,916, or Fazzolare et al., U.S. Pat. No. 4,873,093), or subjecting the chips to a hot air impingement oven (see, e.g., Zussman, U.S. Pat. No. 5,370,898) or subjecting the chips to one or more microwave processes (see, e.g., Kloos, U.S. Pat. No. 4,906,483).

These prior art methods and devices each have their respective drawbacks. Subjecting chips to oil during processing increases the fat content of the final chip, which is undesirable. Exposing the chip to conventional fluid bed impingement ovens does not guarantee that the moisture content for all slices will be at a proper level and generally results in at least part of the final yield containing a lower quality product, i.e. product having excessive moisture or burned product, which must then be reheated or discarded. In particular, impingement ovens have been known to overcook or burn over 60 per cent of the food. The only means available to reduce or eliminate this overcooking is to sacrifice production rates by reducing air temperatures, the amount of potatoes used in the process, or the amount of time the product resides in the oven. Utilizing any one of these steps tends to case harden the final chip, as the slow removal of water prevents the puffing which is desirable in chips.

Subjecting the chip to microwaving generally works with a limited amount of product, and maintaining a high quality over a large batch of potato slices can be difficult.

It is therefore an object of the current invention to provide a method and apparatus for producing fat-free chip products, i.e. chip products having a significantly reduced oil content.

It is also an object of the current invention to provide a method and apparatus for preparing fat-free snack chips which causes an increased usable product yield in a relatively short amount of time over past chip making procedures.

It is another object of the current invention to provide a method and apparatus for preparing fat-free snack chips whereby consistent moisture levels are obtained without overcooking and without imparting a burned flavor to the final product, and at the same time maintains the typical light color preferred by consumers.

It is yet a further object of the current invention to provide a method and apparatus for preparing fat-free snack chips whereby the final product does not exhibit starch gelatinization problems typically associated with excessive microwave application.

SUMMARY OF THE INVENTION

According to the present invention there is provided a method and apparatus for preparing potato, corn, and other chips that is fast, economical, and free of fat frying or oil absorbtion. The method and apparatus of the present invention includes preparing the slices by washing, peeling, slicing, and tumble washing the raw food product. The slices are then subjected to a high intensity air knife arrangement to remove surface moisture. The method and apparatus further includes exposing raw sliced potatoes and the like to a hot air fluid bed impingement arrangement that causes very rapid heating of the water contained in the chip and causes the chip to expand. The hot air fluid bed impingement arrangement preferably includes multiple dual-zone hot air fluid bed impingement ovens operating under different predetermined conditions. The slices are passed through each oven based on a desired conveyor belt speed and temperature range.

In the preferred embodiment of the current invention, the slices are exposed to two dual-zone hot air fluid bed impingement ovens, the first oven having a conveyor belt transporting slices through the oven at a speed of 2.5 to 3.0 feet per minute and operating at 500 to 525 degrees Farenheit (zone 1) and 450 to 500 degrees Farenheit (zone 2). The second oven of the preferred embodiment has a conveyor belt operating at a speed of 1.5 to 2.0 feet per second and at 350 to 400 degrees Farenheit (zone 1) and 300 to 350 degrees Farenheit (zone 2). The dimensions of the second conveyor belt are such that the belt can accommodate the flow of slices received from the first conveyor belt, which travels at a faster speed. The first impingement oven of the preferred embodiment removes approximately 50 to 60 per cent of the moisture in each slice, while the second impingement oven of the preferred embodiment removes approximately 20 to 30 per cent of the remaining moisture.

The slices may then have oil and/or seasoning applied thereto, and are then passed to a combination microwave and hot air dryer which removes entrained moisture without scorching the chips. The combination microwave/convection step dries the chip and provides a lightly colored chip without a burned, overcooked taste and with an equalized moisture content. The resulting chip has an excellent mouth feel without the added absorbed fat associated with deep fat fried chip foods, and the entire process increases the yield associated with snack chip preparation by inhibiting burning while simultaneously reducing excess moisture.

Other objects, features, and advantages of the present invention will become more apparent from a consideration of the following detailed description and from the accompanying drawings.

DETAILED DESCRIPTION OF THE INVENTION

The present invention is a method and apparatus for creating a food chip product that has the flavor, texture, and appearance of a fried food chip but without the high fat content resulting from subjecting the chip to oil. The methodology of the present invention is suitable for the preparation of fat-free chips made from a wide variety of grains, vegetables, fruits, and the like which can be cut or otherwise formed into flat, generally thin, sliced-shaped portions. The methodology of the present invention is also suitable for preparation of a variety of products that are traditionally baked, such as crackers, biscuits, and the like. The term food chip product as used herein refers to food products which generally resemble conventional potato chips, and the term raw product slice means any of the cut or formed slices comprising any of the items or materials described above. It is to be understood that any foods that can be shaped into a chip form from their raw state can be used in connection with this invention, and that any foods that have traditionally been formed into generally flat products and fried can be used with this invention.

Rice and corn can be manipulated into tortillas or other flat shapes and subjected to the current inventive process. For example, tortillas may be formed from water and corn flour, extruded, and then subjected to the current inventive steps. For clarity of explanation the present invention will be described in the context of preparing fat-free potato chips, but it is to be understood by one of ordinary skill in the art that the invention may be practiced using other food products as disclosed above while still within the scope of the invention. Further, as used herein, the terms "slice" or "slices" do not only refer to sectioned raw fruits or vegetables, but also to pressed manipulated corn or flour products, such as biscuits, tortillas, and the like.

Figure 1:
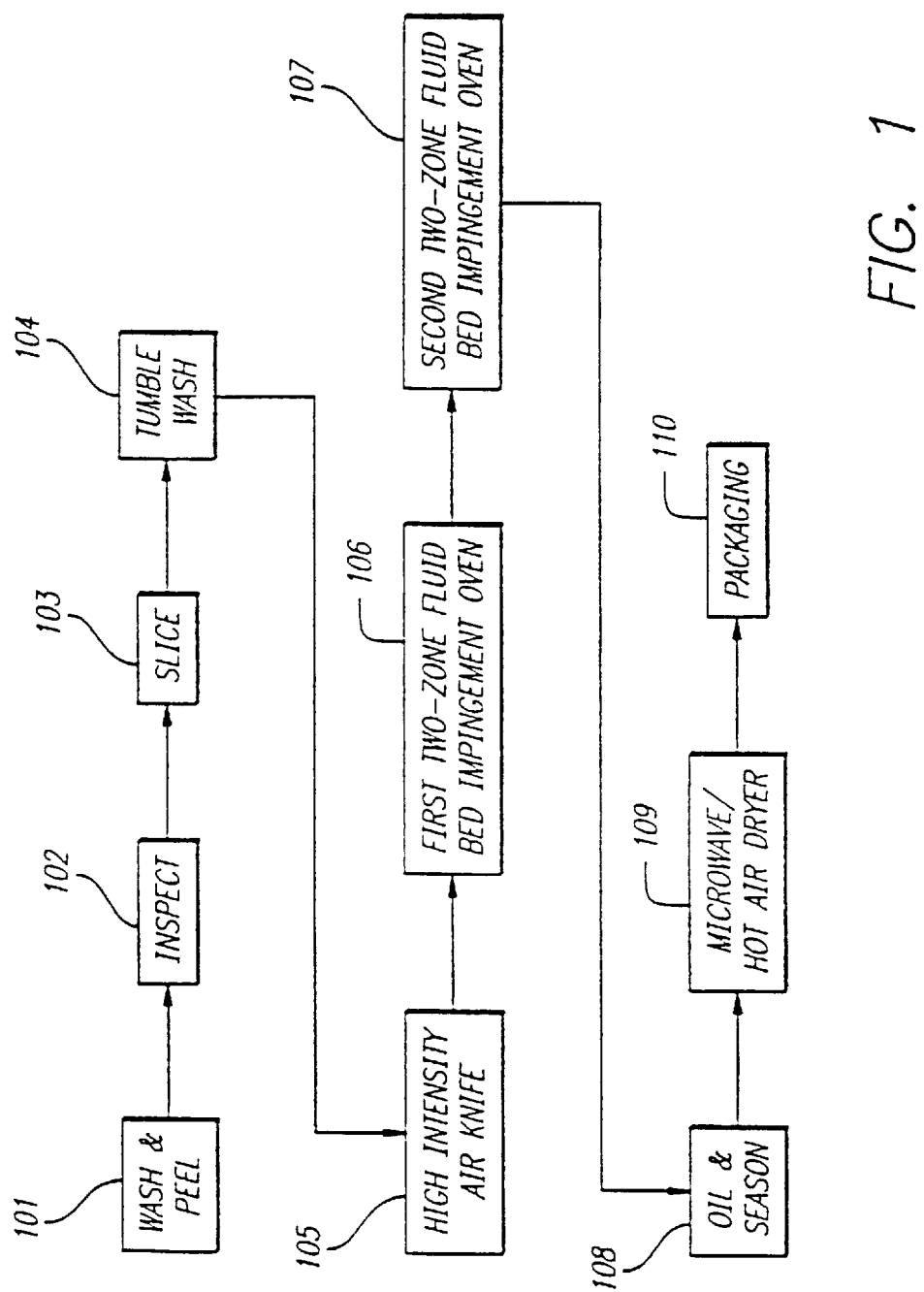
FIG. 1 is a flow chart of the method in accordance with the present invention.

The method in accordance with the current invention is illustrated in FIG. 1. As shown therein, raw unpeeled potatoes are washed and peeled in step 101. The slices may be washed with an aqueous solution, such as tap water, by using a water bath immersion system or a spray system. This initial washing step cleans the exterior of the potatoes. After washing, the potatoes may be peeled by any conventional peeling means, including by hand or by readily available peeling machinery. The washed and peeled potatoes are then inspected for any irregularities in step 102, and unacceptable potatoes discarded or otherwise processed to recover acceptable product.

The washed and peeled potatoes are then sliced by a vegetable slicing device in step 103. The potatoes are sliced to a thickness of approximately 0.060 inches to 0.080 inches. Thinner slices tend to become too fragmented during subsequent steps, while thicker slices will not adequately "puff," i.e. exhibit beneficial "mouth feel" qualities associated with traditional fried food chip products. Commercially available slicing devices include the Urschell™ slicer, manufactured by Urschell in Valparaiso, Ind.

After cutting, the slices are subjected to a tumble wash step 104 which extracts surface starch from the slices and reduces their overall stickiness so as to assist in separating slices during subsequent steps. It is to be noted that no surface coatings or layers are either required or desired on the exterior surfaces of the slices prior to the initial cooking step.

After the slices are tumble washed in step 104, they are distributed on a belt and any excess surface moisture is removed using conventional air-knife type air jets in step 105. Although surface moisture need not be removed from the exterior surfaces of the raw food slices, it has been determined that removal of surface moisture using air knives facilitates the subsequent cooking steps of the current invention. Air knives are a type of forced air current used to remove surface coatings. Air knives use heated jets of air that are directed from above and below the raw, freshly washed and sliced potato slices. These air currents are typically within a range of between about 150 and 250 degrees Farenheit, with a preferred temperature of about 185 to 190 degrees Farenheit. Typical flow rates for these hot air currents are between 50 and 60 cubic feet per minute, and the air knife step 105 further serves to distribute the slices evenly across the belt.

Referring to FIG. 1, the dried slices are then distributed onto a continuous conveyor belt in multiple layers are transported through two individual hot air fluid bed impingement ovens operating under separately controlled conditions in steps 106 and 107.

Figure 2:
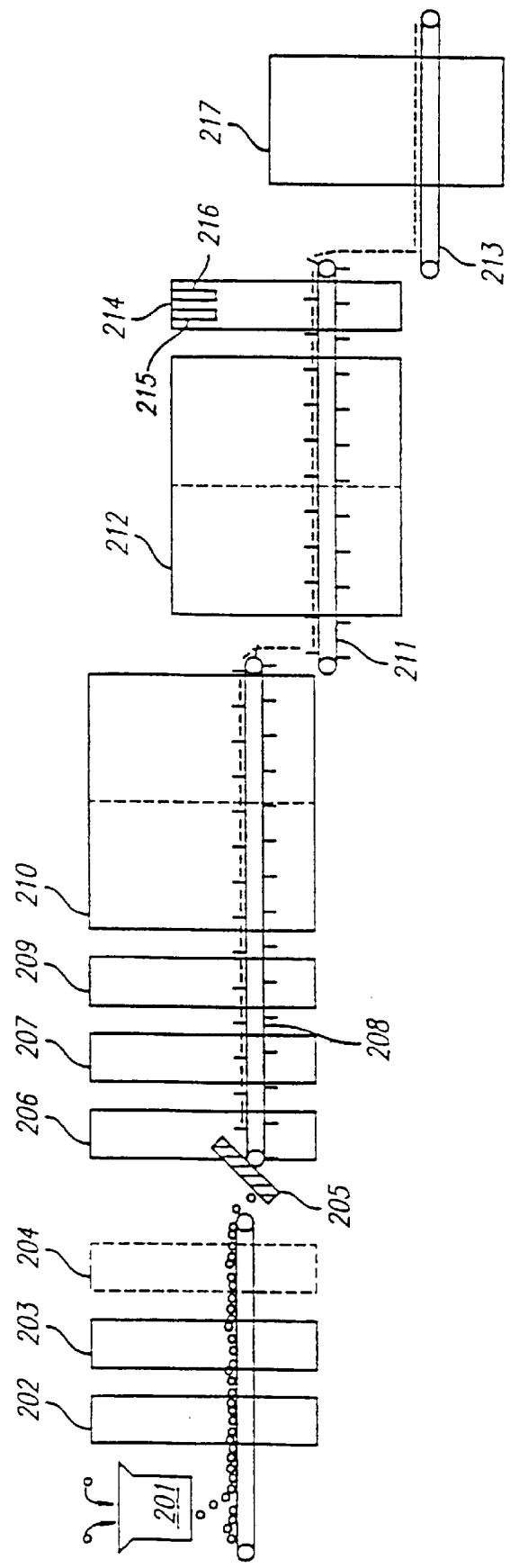
FIG. 2 shows the general interaction between elements of the line operation in accordance with the preferred embodiment of the current invention.

The general interaction of the elements used in line operation of the preferred embodiment of the current invention is illustrated in FIG. 2. FIG. 2 is not to scale. As shown therein, raw food product is placed into a hopper 201. From the hopper 201, the raw food product is passed to a washer 202 and then to peeler 203. Inspection may optionally take place at location 204, and after inspection the peeled product is passed to a screw conveyor mechanism 205 which regulates the flow of peeled product into the slicer 206. The slicer slices the peeled product, and the sliced product passes to tumble washer 207. Tumble washer 207 passes the washed slices via first conveyor belt 208 through air knives 209 and into first dual-zone fluid bed impingement oven 210. The first conveyor belt 208 then transports the partially cooked slices onto second conveyor belt 211, which passes the partially cooked slices through second dual-zone fluid bed impingement oven 212. The second conveyor belt 211 passes the cooked slices through tumbler 214 having atomizers 215 and 216 located therein for application of an oil coating and seasonings. After passing through tumbler 214, the product is passed to third conveyor belt 213, which transports slices through combination microwave/convection oven 217 for final drying, and the product is ready for packaging.

Figure 3:
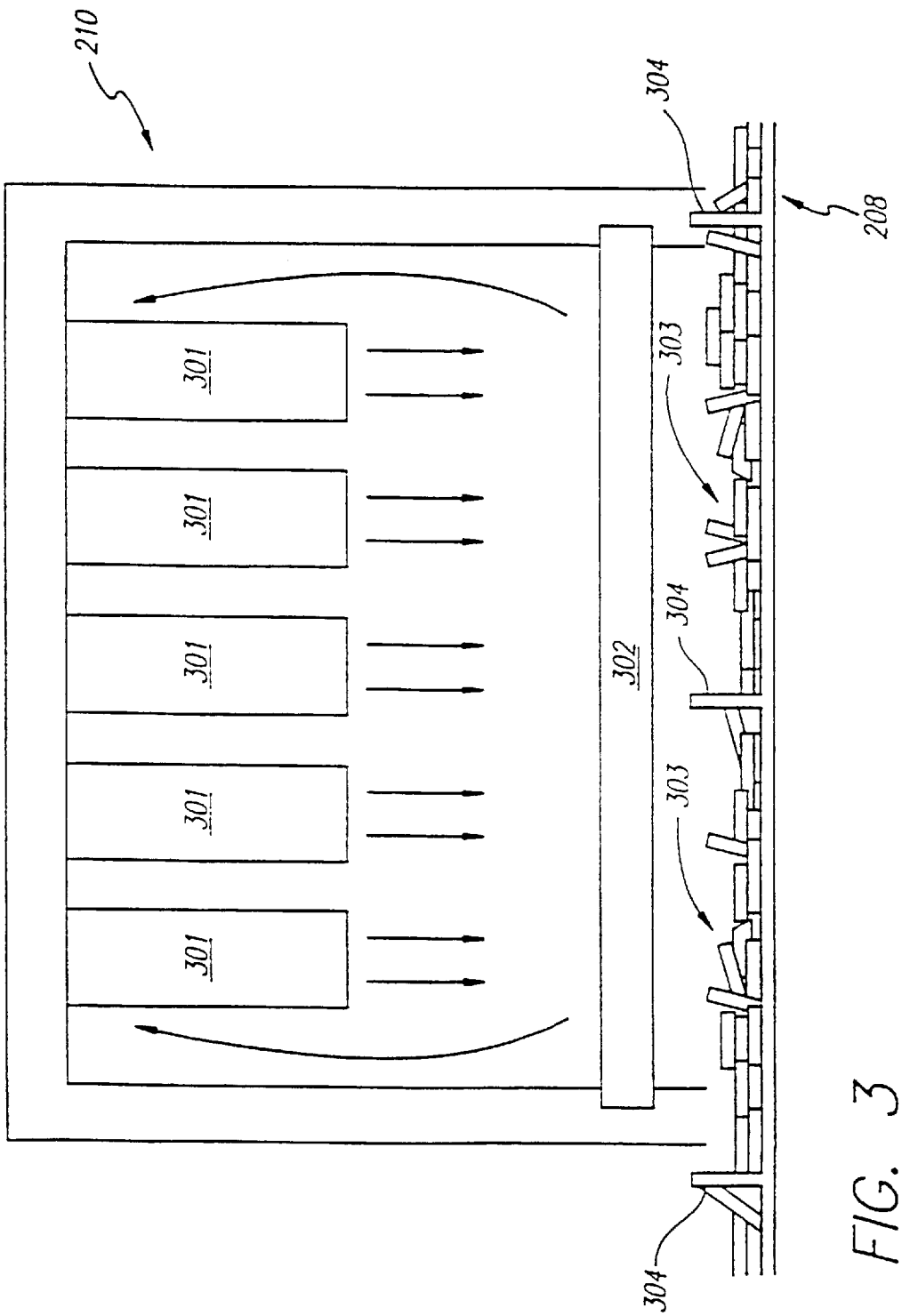
FIG. 3 is a cross sectional view of a dual-zone hot air fluid bed impingement oven as used with the current invention.

FIG. 3 illustrates a cross sectional view of first hot air impingement oven 210. A hot air fluid bed impingement oven arrangement is preferred for the present invention. A hot air fluid bed impingement oven uses heated air or steam discharged at high pressure through tubes 301 into an oven chamber. Multiple tubes 301 are used in typical impingement ovens, but for simplicity and clarity five tubes are shown in FIG. 3. The ovens include a pan portion 302 and first conveyor belt 208 running through the oven and carrying the slices 303. The first and second conveyor belts 208 and 211 for both the first and second impingement ovens are preferably constructed of perforated stainless steel and, as shown in FIG. 2, have a plurality of projections 304 which are substantially perpendicular to the perforated stainless steel conveyor belt. Each conveyor belt may be alternatively be a belt coated with a nonstick layer, such as polytetrafluoroethylene, such as Teflon® synthetic resin polymer, a trademark of E. I. DuPont de Nemours & Co., Wilmington, Del. The first and second conveyor belts 208 and 211 move through each respective impingement oven at a different rate of speed, and thus between the first and second impingement ovens, the partially cooked slices are passed from the first conveyor belt 208 onto the second conveyor belt 211.

The ridges 304 of the conveyor belts 208 and 211 allow movement of the food product through the ovens while suspended on a bed of air, while simultaneously preventing the food product from "floating" into an adjacent region on each belt. The hazards of slices "floating" from one area to another is that floating slices may remain in the oven for a longer time, thereby overcooking the slice, or may stay in the oven a shorter time, which would undercook the slice. The ridges 304 therefore act as barriers to move the food along each conveyor belt in the direction of travel, constraining the slices and ensuring an even flow over the bed of air through each oven. This constraint while the slices are floating within each impingement oven provides an even fluidization process, and results in a better overall finished product at this stage of processing.

The ridges 304 on the first conveyor belt 208 are preferably less than three inches in height spaced approximately thirty inches apart, and all ridges on all conveyor belts used herein span the full width of the conveyor belts. The ridges may be curved or otherwise formed (such as in an inverted-V "trough" type shape) while still being within the scope of the invention. The ridges 304 may also be higher or lower than that mentioned above depending on the type of food and the height of the product when distributed on each belt. As may be appreciated, the difference in speeds between the two conveyor belts may require either longer spacing or higher ridges in the second slower belt to accommodate the food product, as discussed in more detail below.

As shown in FIG. 3, each oven expels hot air or steam out of the tubes 301 downward and at a high velocity toward the slices 303 on the conveyor belt 208. The expelled hot air is reflected back toward the tubes 301. The air may be dried and filtered and reheated buy a burner or other heating device. The reheated air is passed through the tubes and reflected back, and this passing/reflection process is typically repeated multiple times.

The flow of heated air or steam creates the bed of hot air which suspends the layered slices 303 above the upper surface of each conveyor belt 208 and 211. The slices 303 typically bounce when they come in contact with the surface of the belt, and slices may change orientation as they pass through the oven under these conditions.

The length of the tubes 301 is approximately 20 inches and each tube has a diameter of approximately 1 inch, which can vary without being outside the scope of the invention. Other types of fluid bed impingement ovens, such as those which expel air or steam from the sides or bottom of the oven are also acceptable. Hot air or steam may also be expelled from other arrangements besides the tubes shown in FIG. 3 while still within the scope of the invention.

In the preferred embodiment, the slices are exposed to the two ovens at different temperature ranges. Both impingement ovens 210 and 212 are approximately twenty five feet in length. The first oven 210 uses a two-zone arrangement where the first zone uses an air temperature of 500 to 525 degrees Farenheit. The second zone of the first oven 210 operates at a temperature of between 450 and 500 degrees Farenheit. The slices flow through the first oven at approximately 2.5 to 3.0 feet per minute. The slices are separated by the high velocity air striking and circulating off the solid bottom plate of the oven, i.e. air passes through the slices 203, through the perforated stainless steel belt 208, striking the bottom plate 305 of the oven, and passing back through the perforated stainless steel belt 208 and through the slices 303. Alternately, the air may strike a belt coated with a non-stick material and cause the slices to rise by rebounding off this belt.

As the chips float through the first impingement oven, they are surrounded by the approximately 500 degree Farenheit air causing a very rapid heating of the chip, thereby causing the chip to expand, or "puff." The tumbling effect as the chip dries shapes the chip in a similar manner to that of fat frying. The combination of the two zones of the duel zone oven removes approximately 50 to 60 per cent of the total moisture, by weight, from the slice. The result is therefore a slice having from 40 to 50 per cent of the original moisture content of the slice, by weight.

The second dual-zone hot air fluid bed impingement oven 212 operates in a similar manner to the first impingement oven 210 except at a reduced belt speed and at reduced operating temperatures in both zones. The second conveyor belt 211 operates at a speed of approximately 1.5 to 2.0 feet per second. The second fluid bed impingement oven 212 also operates using two zones, with the first zone having a temperature of approximately 350 to 400 degrees Farenheit, and the second zone operating at approximately 300 to 350 degrees Farenheit. Operating the second conveyor belt 211 at a slower speed than the first conveyor belt 208 requires that the second belt have larger dimensions, i.e. larger spacing between ridges and/or a larger bed depth to accommodate the increased product flow or the higher volume of product being delivered at the input of the first zone. Bed depth, or ridge height, is increased due to the reduced belt speed, as more product is distributed into a given zone, and the slower movement of the belt increases exposure time at a lower temperature. The second impingement oven 212 removes approximately 20 to 30 per cent of the remaining moisture, by weight. From the original slice, the first impingement oven 210 removes 50 to 60 per cent of the moisture of the slice, leaving 40 to 50 per cent of the original weight. Second impingement oven 212 removes 20 to 30 per cent of the remaining moisture, yielding at this stage a range of between 28 to 40 per cent of the original moisture by weight.

At the end of the dual-impingement oven exposure steps 106 and 107, the slices 303 generally have the appearance of conventional potato chips. The problem is that the moisture content of a percentage of the slices may be too high, resulting in a portion of the yield being in an unfinished state.

The chips in their present form are transmitted to a rotating drum for seasoning in step 108. A light amount of canola oil and salt or other flavoring mix is applied to the tumbling potato chips in the rotating drum. Seasoning with oil at this stage of the process allows the cellular structure of the chip to expand, allowing equal distribution of the oil and seasonings over the chip surface. Application of oil at this cooked stage of the process has proven to enhance the taste of the chip, and the oil only lightly coats each chip. This differs from the immersion of raw slices into deep fat fryers, wherein oil is absorbed into the slice as the slice is fried. In the current cooked chip state, no significant oil absorbtion occurs. The oil coating becomes carmelized, thereby imparting fried flavor notes to the chip and enhancing overall mouth feel. The chips are salted or seasoned using an atomizer located within the tumbler.

After seasoning, the chips are passed to a combination microwave-hot air dryer in step 109 to further dry the chips.

This final drying step may be advantageously accomplished by a low power multi-mode microwave drying unit. In the presently preferred embodiment suitable for preparing potato chips, a conventional microwave "baking unit" Model No. IV-60, available from MICRODRY INC. of Crestwood, Ky. is employed. This unit is typically 48 feet long and includes a microwave transparent conveyor belt which is 6 feet wide. The conveyor belt is disposed between two perforated stainless steel plates disposed parallel to one another so as to form a multi-mode microwave cavity. Microwaves are injected into this cavity through two waveguides disposed along the top of the cavity with apertures communicating between the waveguide and the cavity. Normally four 60 kilowatt microwave generators are coupled to the waveguide to provide a total power input of 240 kilowatts into the microwave cavity. The intensity of the microwave field within the MICRODRY baking unit is relatively low, typically on the order of 6 watts per square inch. The energy density is enough to dry the partially processed chips but does not cause the puffing and surface roughening that normally occurs upon exposure to a high intensity microwave process. The actual microwave energy density employed depends on the chip density desired within the baking unit and the rate of travel for chips through the unit. If a maximum travel rate is desired so as to optimize chip production, then the maximum 240 kilowatt power output would preferably be employed. As used herein, the term low intensity microwave field means a field intensity sufficient to induce these effects.

During this final microwave drying stage the moisture content is reduced to a final amount of approximately 2 to 4 per cent by weight. Typically the conveyor belt for the microwave moves at a rate of ten to fifteen feet per minute, providing an exposure time for the potato slices of between about 3.2 to 4.8 minutes. Hot air is injected into the microwave cavity at a temperature of about 200 to 225 degrees Farenheit at a rate of approximately 200 feet per minute. This temperature is just high enough to remove the evaporated water from the oven. The hot air movement prevents condensation within the drying cavity and contributes to the final crispening of the chips.

During this stage of the chip preparation process, the chips need not be arranged in a single layer to achieve satisfactory drying and, in the preferred embodiment, are arranged in layers on the third conveyor belt 213 of up to approximately 4 inches deep.

This microwave and hot air drying step removes entrained moisture without scorching the chips as is a normal result of excessive application of hot air. The resulting chips retain the light coloring desired by consumers.

Figure 4:
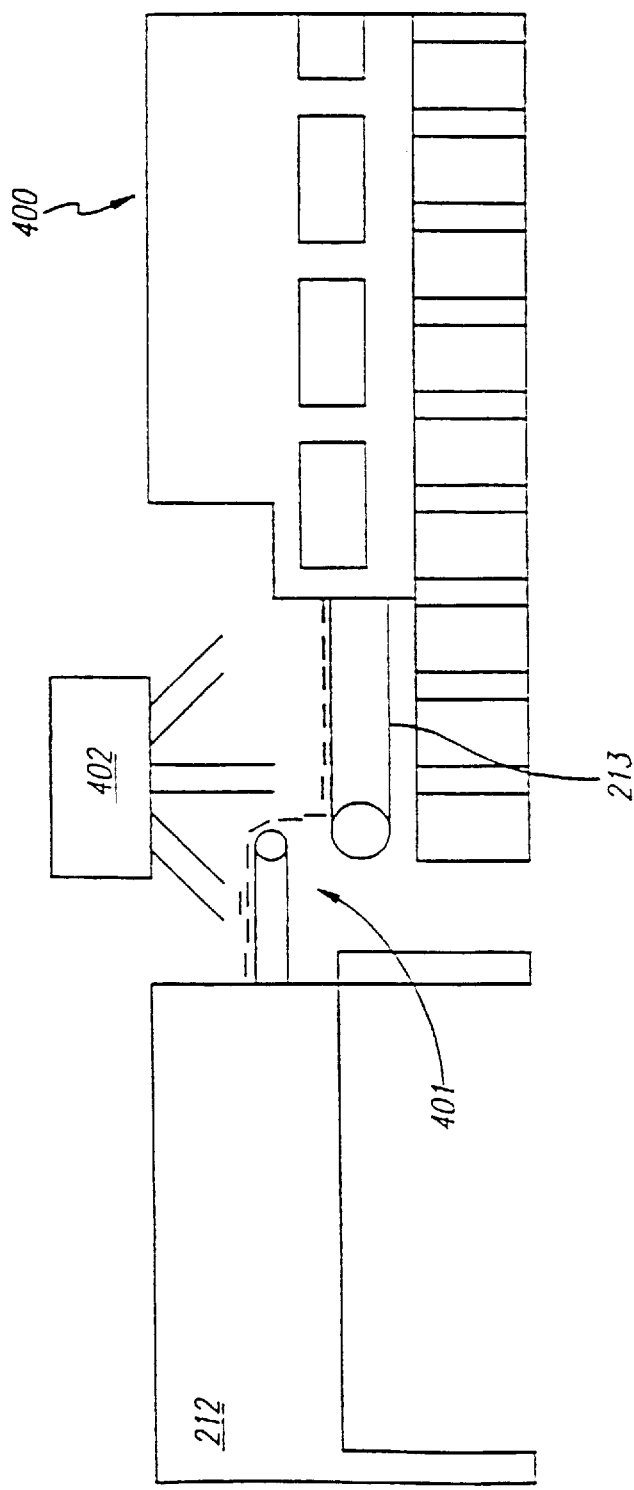
FIG. 4 illustrates the microwave/convection heat drying unit used with the present invention.

Referring to FIG. 4, the MICRODRY baking unit 400 is shown adjacent to the second dual-zone hot air fluid bed impingement oven 212. Third conveyor belt 213 of the baking unit 400 may be disposed slightly underneath an output end 401 of second conveyor belt 211 to catch the chips 303 as they leave the second fluid bed impingement oven 212. If desired, spraying units or atomizers 402 may be employed at this point to add "barbecue" and similar flavorings to the chips. The chips leaving the baking unit 400 are in final form, ready for any desired final inspection and subsequent packaging, as depicted in step 110.

Application of the present invention to potato slices produces a potato chip having the texture, consistency, and flavor of deep fat fried potato chips, but without absorbed fat. The chips resulting from the present invention have an extended shelf life and the apparatus and method eliminate certain preparation safety hazards associated with working with large quantities of hot oil.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

I claim:

1. A process for making low fat chips from uncooked product slices, comprising the steps of:

subjecting the raw product slices to a hot air fluid bed impingement oven arrangement; and subsequently exposing said slices to a microwave drying process.

2. The process of claim 1, wherein said subjecting step comprises transporting said raw product slices through a plurality of hot air fluid bed impingement ovens.

3. The process of claim 2, wherein each hot air fluid bed impingement oven operates under different predetermined conditions.

4. The process of claim 3, wherein said predetermined conditions comprise at least one of:

temperature; and conveyor belt speed.

5. The process of claim 3, wherein each hot air fluid bed impingement oven operates at a different temperature.

6. The process of claim 1 wherein the uncooked product slices are raw potato slices.

7. The process of claim 1, further comprising the step of applying coatings to said slices between said subjecting and exposing steps.

8. The process of claim 7, wherein said coatings applied to said slices comprise oil and seasonings.

9. The process of claim 2, wherein transporting said raw product slices through each hot air fluid bed impingement oven comprises exposing said slices to a two-zone impingement oven arrangement.

10. The process of claim 1 wherein said microwave drying process comprises exposing the product slices to low intensity microwaves.

11. The process of claim 1, further comprising the step of removing surface moisture before said subjecting step.

12. A process for making low fat chips from uncooked product slices, comprising the steps of:

exposing the slices to a hot air fluid bed impingement process, thereby causing the slices to expand; and drying said slices using microwaves to form a chip.

13. The method of claim 12, wherein said drying step comprises using low intensity microwaves.

14. The method of claim 12, wherein said drying step comprises using microwaves in combination with hot air.

15. The method of claim 12, further comprising the step of removing most of the surface moisture from each raw product slice before exposing the slices to the hot air discharging system.

16. The method of claim 12, wherein said exposing step comprises transporting said slices through a hot air fluid bed impingement oven arrangement.

17. The method of claim 16, wherein transporting said slices comprises conveying said raw product slices through a plurality of hot air fluid bed impingement ovens.

18. The process of claim 17, wherein each hot air fluid bed impingement oven operates under different predetermined conditions.

19. The process of claim 18, wherein said predetermined conditions comprise at least one of:

temperature; and conveyor belt speed.

20. The process of claim 18, wherein each hot air fluid bed impingement oven operates at a different temperature.

21. The process of claim 12 wherein the uncooked product slices are raw potato slices.

22. The process of claim 12, further comprising the step of applying coatings to said slices between said exposing and drying steps.

23. The process of claim 22, wherein said coatings applied to said slices comprise oil and seasonings.

24. The process of claim 16, wherein transporting said raw product slices through each hot air fluid bed impingement oven comprises exposing said slices to a two-zone impingement oven arrangement.

25. The process of claim 15, wherein said surface moisture removal step comprises subjecting the raw product slices to hot air currents.

26. The process of claim 16, wherein each hot air fluid impingement oven operates at a lower temperature than each preceding hot air fluid impingement oven.

27. A product made by the process of first exposing an uncooked product slice to a hot air fluid bed impingement process, thereby causing the slices to expand and then drying said slices using microwaves to produce a chip without any added fat.

28. The chip of claim 27 wherein the product slice is a potato slice and the resulting chip is an oil free potato chip.

29. A process for making low fat chips from uncooked product slices, comprising the steps of:

exposing the slices to a heated fluid bed impingement process wherein the fluid is discharged at high pressure, thereby causing the slice to expand; and drying the slices using a combination of microwave and heated fluid.

30. The process of claim 29, wherein said exposing step uses heated air discharged at high pressure.

31. The process of claim 29, wherein said exposing step uses steam discharged at high pressure.

32. The process of claim 29, wherein said drying step comprises using a combination of microwaves and hot air.

33. The process of claim 29, wherein said drying step comprises using low intensity microwaves.

34. The process of claim 29, further comprising the step of removing most of the surface moisture from each raw product slice before said exposing step.

35. The process of claim 29, wherein said exposing step comprises transporting said slices through a hot air fluid bed impingement oven arrangement.

36. The process of claim 35, wherein transporting said slices comprises conveying said raw product slices through a plurality of hot air fluid bed impingement ovens.

37. An apparatus for making low fat chips from uncooked products, comprising:

a plurality of hot air fluid bed impingement ovens, wherein each oven operates under different predetermined conditions.

38. The apparatus of claim 37, further comprising a combination microwave-hot air drying unit.

39. The apparatus of claim 37, wherein each impingement oven comprises means for transporting slices through the impingement oven.

40. The apparatus of claim 39, wherein said means for transporting slices through each impingement oven comprises a conveyor belt, and wherein each conveyor belt transports slices through each oven at a different speed.

41. The apparatus of claim 37, wherein each oven operates at a different temperature.

* * * * *